(12) United States Patent
Schleich

(10) Patent No.: US 10,533,649 B2
(45) Date of Patent: Jan. 14, 2020

(54) COMBINED MULTI-STAGE GEARING

(71) Applicant: Bayerische Motoren Werke Aktiengesellschaft, Munich (DE)

(72) Inventor: Thomas Schleich, Weilheim (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 312 days.

(21) Appl. No.: 15/471,002

(22) Filed: Mar. 28, 2017

(65) Prior Publication Data

US 2017/0198791 A1 Jul. 13, 2017

Related U.S. Application Data

(63) Continuation of application No. PCT/EP2015/076021, filed on Nov. 9, 2015.

(30) Foreign Application Priority Data

Nov. 25, 2014 (DE) .................. 10 2014 223 919

(51) Int. Cl.
*F16H 37/04* (2006.01)
*F16H 3/66* (2006.01)
*F16H 3/44* (2006.01)

(52) U.S. Cl.
CPC ............ *F16H 37/04* (2013.01); *F16H 3/663* (2013.01); *F16H 2003/445* (2013.01);
(Continued)

(58) Field of Classification Search
None
See application file for complete search history.

(56) References Cited

U.S. PATENT DOCUMENTS 2,026,733 A * 1/1936 Fast .................. F16D 13/34
188/264 A
2,339,643 A * 1/1944 Le Tourneau .......... F16D 13/28
192/111.13
(Continued)

FOREIGN PATENT DOCUMENTS

CN 103527732 A 1/2014
CN 104006120 A 8/2014
(Continued)

OTHER PUBLICATIONS

International Search Report (PCT/ISA/210) issued in PCT Application No. PCT/EP2015/076021 dated Feb. 9, 2016 with English-language translation (four (4) pages).
(Continued)

*Primary Examiner* — Colby M Hansen
(74) *Attorney, Agent, or Firm* — Crowell & Moring LLP

(57) ABSTRACT

A combined multistage gearing has a spur gearing having at least one first and one second spur wheel arranged on a spur gear shaft, an epicyclic gearing having at least one first and one second, in particular reduced, planetary wheel set and an epicyclic gearing shaft, wherein at least one of the planetary wheel sets is arranged concentrically to the epicyclic gearing shaft, a gearing housing, wherein the spur gear shaft and the epicyclic gearing shaft are rotatably mounted relative to the gearing housing, and a plurality of switching apparatuses. The first spur gear can be selectively connected in a torque-transmitting manner to the spur gear shaft. The first spur gear can be selectively connected in a torque-transmitting manner to the gearing housing.

13 Claims, 5 Drawing Sheets

(52) U.S. Cl.
CPC ............... *F16H 2037/048* (2013.01); *F16H 2200/0052* (2013.01); *F16H 2200/0056* (2013.01); *F16H 2200/2046* (2013.01); *F16H 2200/2048* (2013.01); *F16H 2200/2064* (2013.01); *F16H 2200/2094* (2013.01)

(56) References Cited

U.S. PATENT DOCUMENTS

| | | | | |
|---|---|---|---|---|
| 3,557,573 | A | * | 1/1971 | Hansgen .................. F16D 3/76 192/209 |
| 3,915,033 | A | * | 10/1975 | Polak ........................ F16H 3/66 475/286 |
| 4,089,239 | A | | 5/1978 | Murakami et al. |
| 4,614,133 | A | * | 9/1986 | Nerstad .................. F16H 37/04 475/218 |
| 4,676,116 | A | * | 6/1987 | Nerstad .................. F16H 37/04 74/15.66 |
| 5,033,597 | A | * | 7/1991 | Schmutz ............... F16D 25/044 192/207 |
| 5,039,305 | A | * | 8/1991 | Pierce .................... B60K 17/06 475/200 |
| 6,080,074 | A | * | 6/2000 | Ulbrich .................. F16H 47/04 475/72 |
| 2005/0020398 | A1 | * | 1/2005 | Tabata .................... F16H 3/663 475/269 |
| 2010/0029433 | A1 | | 2/2010 | Tenberge |
| 2015/0087469 | A1 | | 3/2015 | Beck |
| 2016/0017959 | A1 | | 1/2016 | Beck |

FOREIGN PATENT DOCUMENTS

| | | |
|---|---|---|
| DE | 692 06 050 T2 | 6/1996 |
| DE | 10 2007 014 150 A1 | 9/2008 |
| DE | 10 2012 001 846 A2 | 8/2013 |
| DE | 10 2012 207 028 A1 | 10/2013 |
| DE | 10 2012 221 073 A1 | 5/2014 |

OTHER PUBLICATIONS

German-language Written Opinion (PCT/ISA/237) issued in PCT Application No. PCT/EP2015/076021 dated Feb. 9, 2016 (fourteen (14) pages).
German-language Office Action issued in counterpart German Application No. 10 2014 223 919.2 dated Sep. 18, 2015 (four (4) pages).
Chinese-language Office Action issued in counterpart Chinese Application No. 201580049027.2 dated Sep. 28, 2018 with English translation (14 pages).

* cited by examiner

| | Shift diagram: | | | | | | |
|---|---|---|---|---|---|---|---|
| | 1.SE | 2.SE | 3.SE | 4.SE | 5.SE | 6.SE | 7.SE |
| Gearspeed R | ▨ | ▨ | | | | | |
| Gearspeed 1 | | | ▨ | ▨ | | | |
| Gearspeed 2 | | ▨ | ▨ | | | | |
| Gearspeed 3 | | | ▨ | | ▨ | | |
| Gearspeed 4 | | | | ▨ | | ▨ | |
| Gearspeed 5 | | | | | ▨ | | ▨ |
| Gearspeed 6 | | | | | | ▨ | ▨ |
| Gearspeed 7 | | | | ▨ | ▨ | | |

| | Shift diagram: | | | | | |
|---|---|---|---|---|---|---|
| | 1.SE | 2.SE | 3.SE | 4.SE | 5.SE | 6.SE |
| Gearspeed R | ▨ | ▨ | | | | |
| Gearspeed 1 | | ▨ | ▨ | ▨ | | |
| Gearspeed 2 | | | ▨ | ▨ | | |
| Gearspeed 3 | | | ▨ | | ▨ | |
| Gearspeed 4 | | ▨ | | | | ▨ |
| Gearspeed 5 | | | | | ▨ | ▨ |
| Gearspeed 6 | | | | ▨ | | ▨ |

| | Shift diagram: | | | | | |
|---|---|---|---|---|---|---|
| | 1.SE | 2.SE | 3.SE | 4.SE | 5.SE | 6.SE |
| Gearspeed R | ▨ | ▨ | | | | |
| Gearspeed 1 | | | ▨ | ▨ | | |
| Gearspeed 2 | | ▨ | ▨ | | | |
| Gearspeed 3 | ▨ | | | | ▨ | |
| Gearspeed 4 | | ▨ | | | | ▨ |
| Gearspeed 5 | | | | | ▨ | ▨ |
| Gearspeed 6 | | | | ▨ | ▨ | |

| | Shift diagram: | | | | | | |
|---|---|---|---|---|---|---|---|
| | 1.SE | 2.SE | 3.SE | 4.SE | 5.SE | 6.SE | 7.SE |
| Gearspeed R | ▨ | ▨ | | | | | |
| Gearspeed 1 | | ▨ | ▨ | | | | |
| Gearspeed 2 | | | ▨ | ▨ | | | |
| Gearspeed 3 | | | ▨ | | ▨ | | |
| Gearspeed 4 | | ▨ | | | | ▨ | |
| Gearspeed 5 | | | | ▨ | | ▨ | |
| Gearspeed 6 | | | | ▨ | | | ▨ |
| Gearspeed 7 | | | | | ▨ | ▨ | |

COMBINED MULTI-STAGE GEARING

CROSS REFERENCE TO RELATED APPLICATIONS

This application is a continuation of PCT International Application No. PCT/EP2015/076021, filed Nov. 9, 2015, which claims priority under 35 U.S.C. § 119 from German Patent Application No. 10 2014 223 919.2, filed Nov. 25, 2014, the entire disclosures of which are herein expressly incorporated by reference.

BACKGROUND AND SUMMARY OF THE INVENTION

The invention relates to a combined gearbox having multiple shiftable transmission ratios. A combined multi-stage gearbox of this type is known from DE 10 2012 207 028 A1.

Below, the invention will be described on the basis of a shift gearbox for a passenger motor vehicle, but this is not to be understood as a restriction of the invention.

In passenger motor vehicles, space conditions are becoming restricted in particular owing to the increasing number of secondary and auxiliary assemblies, and this results in the requirement to provide particularly compact components with simultaneously high functionality. For shift gearbox devices, regardless of whether they are designed to be manually actuable, or automatable so as to shift automatically, there is furthermore the requirement to provide an adequate gearbox spread (ratio, transmission ratio of lowest gear/transmission ratio of highest gear). In the past, to be able to realize a large gearbox spread in a small structural space, combined shift gearboxes, in particular a combination of an epicyclic gearbox with a spur-gear gearbox, have proven to be a suitable approach. DE 10 2012 207 028 A1 discloses a combined shift gearbox of this type in the form of a multi-stage gearbox that can perform shifts under load. Here, the gearbox is driven by way of the sun pinion shaft of an epicyclic gearbox, wherein this epicyclic gearbox is composed of two planetary gear sets and the transmission ratio thereof can be varied by way of a multiplicity of brakes and clutches. The epicyclic gearbox is, in particular in order to broaden the spread, combined with a spur-gear gearbox, by way of which drive is output from the combined shift gearbox device.

It is an object of the invention to provide a combined multi-stage gearbox with a small structural space requirement.

This and other objects are achieved by way of a combined multi-stage gearbox in accordance with embodiments of the invention.

In the context of the invention, a multi-stage gearbox is to be understood to mean a gearbox device which has multiple discrete transmission ratios (ratio, drive input rotational speed to drive output rotational speed). This transmission ratios are preferably settable selectively, in particular in discrete stages by way of a multiplicity of shift devices. In this context, a multi-stage gearbox is to be understood to mean a shift gearbox device for passenger motor vehicles, having a multiplicity of, preferably five or more, preferably six or more and particularly preferably seven or more, forward gearspeeds and one or more reverse gearspeeds. In this context, a gearspeed is to be understood to mean a discrete transmission ratio of the gearbox device. The multi-stage gearbox has in particular at least two sub-gearboxes, of which a first sub-gearbox is a spur-gear gearbox and a second gearbox is an epicyclic gearbox.

It is furthermore preferable for a multi-stage gearbox of this type to be provided for longitudinal installation, and preferably for transverse installation. Here, in this context, longitudinal installation is to be understood to mean that a spur-gear shaft of the multi-stage gearbox is oriented parallel to the main direction of travel of the vehicle, and transverse installation is to be understood in particular to mean that a spur-gear shaft is arranged transversely, preferably orthogonally, with respect to said direction.

In the context of the invention, a spur-gear gearbox is to be understood to mean a gearbox device which has, in particular, externally toothed spur gears, wherein said spur gears are arranged on shafts which are axially parallel to one another. In the context of the invention, a spur gear is to be understood to mean an at least substantially cylindrical gearwheel with a toothing arranged on the outside of the cylinder for the purposes of transmitting motion and power, wherein said toothing is preferably to be understood to mean a straight or preferably helical toothing.

A spur-gear gearbox preferably has at least one first and one second spur gear arranged on a spur-gear shaft. It is furthermore preferable for said two spur gears to mesh with two further spur gears, wherein the latter are mounted so as to be rotatable about an axis of rotation which is axially parallel to the spur-gear shaft. Here, the spur gears are arranged in pairwise fashion on the spur-gear shaft and with respect to the axis of rotation such that in each case two spur gears on different shafts make contact (mesh with one another for the purposes of transmitting motion) in their toothing region for the purposes of transmitting power.

In the context of the invention, an epicyclic gearbox is to be understood to be a gearbox device having at least one internal gear, at least one planet gear which meshes with said internal gear, and at least one sun gear which meshes with said planet gear, and also a planet gear carrier designed for the mounting of the planet gear. The epicyclic gearbox is furthermore preferably arranged entirely or at least partially concentrically with respect to said axis of rotation. A combination of a sun pinion, an internal gear, at least one planet gear and a planet gear carrier may also be understood to be a planetary gear set. It is furthermore possible for a planetary gear set having no sun pinion or alternatively no internal gear to be understood to be a so-called reduced planetary gear set. It is furthermore preferably the case that drive is output from said epicyclic gearbox by way of an epicyclic gearbox shaft, which is preferably arranged concentrically with respect to the axis of rotation.

The epicyclic gearbox preferably has at least one first and one second planetary gear set. It is furthermore preferable for drive to be output by way of the second planetary gear set. It is furthermore preferable for one of said planetary gear sets of the epicyclic gearbox to be understood to be a reduced planetary gear set. It is preferable for individual elements (sun pinion, planet gear, planet gear carrier, internal gear) of the first planetary gear set to be connectable to elements (sun pinion, planet gear, planet gear carrier, internal gear) of the second planetary gear set. In particular, different transmission ratios can be set by way of the selective connection of different elements.

The epicyclic gearbox is preferably to be understood to be a combination of the first planetary gear set and the second, reduced planetary gear set. It is furthermore preferable for the epicyclic gearbox to be understood to be a so-called Ravigneaux gear set. In the context of the invention, a Ravigneaux set is to be understood to be an epicyclic gearbox in which two planet gears which mesh with one another are rotatably mounted on a common planet gear carrier, and furthermore, the Ravigneaux set has a first and a second sun pinion, but only one internal gear. In particular by way of a reduced planetary gear set, it is possible to realize a particularly compact construction of the gearbox device.

In the context of the invention, a gearbox housing is to be understood to mean a device which is provided for accommodating the spur-gear gearbox and the epicyclic gearbox, in particular for rotatably mounting the spur-gear shaft and the epicyclic gearbox shaft. It is furthermore preferable for the gearbox housing to be designed for accommodating a lubricant.

In the context of the invention, a shift device is to be understood to mean a device for the positively locking, non-positively locking or positively/non-positively locking connection of two parts, components or devices of the gearbox to one another, and furthermore, by way of the shift device, a force or a torque can be transmitted between the two components. A shift device is preferably to be understood to mean a device which is selected from a group, wherein said group has at least the following elements:
  synchronization device, in particular conical synchronization,
  multiplate clutch or brake,
  shoe-type brake or clutch,
  toothed coupling,
  sliding-sleeve device.

In this context, a shift device is preferably to be understood to mean a device for connecting in particular one of the gearwheels, one of the shafts, the planet gear carrier or the gearbox housing to in particular a further one of the gearwheels, the shafts, the planet gear carrier or the gearbox housing. It is preferable for a shift device to form at least one friction pairing by way of, in particular, friction plates or friction cones, or preferably a positively locking connection, in particular by way of claws, hooks, toothings or a sliding sleeve.

It is furthermore preferable for at least one of the shift devices, preferably multiple and particularly preferably all, to be designed as a shift device that can be shifted under load. It is preferably the case that the forces/torques can be transmitted between the components designed for the coupling action, at least partially or entirely in non-positively locking fashion. It is furthermore preferably the case, in particular by way of the non-positively locking transmission, that shifting under load is made possible, or preferably a manual actuation of the shift device, and it is thus possible in particular for so-called manual shifting to be realized. In particular shift devices with at least partially non-positively locking torque transmission permit shifting under load or manual shifting or shifting of the multi-stage gearbox without an interruption in traction power, and it is thus possible to realize an improved gearbox.

It is preferably the case that a shift device is a combination of at least two of the devices mentioned above, preferably a sliding sleeve with at least one friction cone or at least one friction plate.

In the context of the invention, selective connection in torque-conducting fashion is to be understood to mean that two components, in particular shafts, gearwheels or sections of the gearbox housing, are, by actuation of a shift device, connectable to one another such that a torque can be transmitted between the parts that are connected to one another (shift device activated).

Such a selective connection can be released by way of the shift device, such that in this case, no torque can be transmitted between the two parts (shift device deactivated).

Tests have shown that, in the case of combined multi-stage gearboxes, a particularly compact construction can be achieved in particular if the first spur gear is selectively connectable in torque-conducting fashion to the gearbox housing. It is thus possible in a particularly simple manner for a rotational speed of zero to be predefined for at least some of the gearwheels (first spur gear, fourth spur gear).

In a preferred embodiment of the multi-stage gearbox, the spur-gear shaft and the epicyclic gearbox shaft are designed for power transmission from and to the multi-stage gearbox. Here, in the context of the invention, power transmission from and to the multi-stage gearbox is to be understood to mean that drive power can be supplied to the gearbox from an outside source, in particular drive power (torque, rotational speed) can be supplied from a drive machine such as a reciprocating-piston engine. Furthermore, such drive power (rotational speed, torque) can be output to outside the gearbox, in particular to at least one driven wheel of the motor vehicle. The spur-gear shaft and the epicyclic gearbox shaft are preferably to be understood to be the gearbox input shaft and gearbox output shaft and vice versa. Tests have shown that, in an embodiment in which the gearbox input shaft is in the form of a spur-gear shaft and the gearbox output shaft is in the form of an epicyclic gearbox shaft, particularly compact dimensions of the multi-stage gearbox can be realized.

In a preferred embodiment, the spur-gear shaft and the epicyclic gearbox shaft are to be understood to be two axially parallel gearbox shafts; in particular, the two gearbox shafts are arranged incongruently with respect to one another. In particular owing to the incongruent arrangement of the spur-gear shaft and the epicyclic gearbox shaft, a nested configuration of the multi-stage gearbox is made possible, and thus a particularly compact construction of the gearbox can be realized.

In a preferred embodiment, the second spur gear meshes with a third spur gear, and the third spur gear is selectively connectable in torque-conducting fashion to a planet gear carrier, at least of the first planetary gear set, preferably of the first and of the second planetary gear set. It is furthermore preferable for the planet gear carrier to be arranged concentrically with respect to the epicyclic gearbox shaft. It is preferable for the third spur gear and the planet gear carrier to be arranged concentrically with respect to one another. The second spur gear is preferably connected to, preferably formed integrally with, the spur-gear shaft. In particular by way of the arrangement of the third spur gear on a shaft which is concentric with respect to the epicyclic gearbox shaft and to which the third spur gear is selectively connectable in torque-conducting fashion, the multi-stage gearbox can be made more compact.

In a further preferred embodiment, the third spur gear is selectively connectable in torque-conducting fashion to a sun pinion shaft or to a sun gear of the first planetary gear set. In particular, by way of this selective connectability of the third spur gear to different components of the first planetary gear set, at least planet gear carrier, sun pinion shaft, a simple means for varying the transmission ratios of the multi-stage gearbox is realized, and furthermore, in particular a compact construction of the gearbox can be realized.

In a preferred embodiment of the multi-stage gearbox, the third spur gear is selectively connectable in torque-conducting fashion to an internal gear of the first planetary gear set.

In particular by way of this connectability of the third spur gear, the third spur gear can be utilized for different transmission ratios (a first transmission ratio, coupling of third spur gear and sun pinion, a second transmission ratio, coupling of third spur gear and internal gear of the first planetary gear set), and thus a particularly compact construction of the gearbox can be realized.

In a preferred embodiment, the third spur gear is selectively connectable in torque-conducting fashion to the gearbox housing. In particular by way of this connectability of the third spur gear to the gearbox housing. In particular by way of this coupling, further utilization of the spur gear is made possible, a rotational speed of zero can be predefined, and the multi-stage gearbox can be made more compact.

It is preferable for both the internal gear of the first planetary gear set and the sun pinion of the first planetary gear set or the sun gear of the first planetary gear set to be arranged concentrically or coaxially with respect to the epicyclic gearbox shaft. It is furthermore preferable for the sun pinion shaft or the sun gear of the second, in particular reduced, planetary gear set to be understood to be an epicyclic gearbox shaft. It is preferable for the second planetary gear set to have at least one second planet gear, but preferably a multiplicity of second planet gears. It is preferable for the second planetary gear set to be a reduced planetary gear set, and to have no dedicated internal gear.

In a preferred embodiment of the multi-stage gearbox, the first planetary gear set has at least one first planet gear, preferably a multiplicity of first planet gears, and the second planetary gear set has at least one second planet gear, but preferably a multiplicity of second planet gears. It is preferably the case that in each case one first planet gear meshes with one of said second planet gears. It is furthermore preferably the case that at least one first planet gear meshes with the internal gear of the first planetary gear set; it is preferably the case that all first planet gears mesh with said internal gear. It is preferably the case that a second planet gear meshes with the sun pinion of the second planetary gear set; it is preferably the case that all second planet gears mesh with said sun pinion. It is furthermore preferably the case that at least one first, preferably all first, and one second, preferably all second, planet gears are rotatably mounted on a common planet gear carrier, in particular on the planet gear carrier of the first planetary gear set.

It is preferable for at least one planet gear to be mounted on the planet gear carrier by way of a plain bearing arrangement, preferably by way of a rolling bearing arrangement. It is preferable for a multiplicity of said planet gears to be mounted on the planet gear carrier in this way, and it is preferable for all planet gears to be mounted by plain bearing means, and particularly preferably by rolling bearing means.

An epicyclic gearbox of this type with a first planetary gear set and a second, in particular reduced, planetary gear set, may be regarded as a so-called Ravigneaux gear set, and this in particular results in a particularly compact construction of the multi-stage gearbox.

In a preferred embodiment, the planet gear carrier is selectively connectable in torque-conducting fashion to the gearbox housing. The selective connection of the planet gear carrier to the gearbox housing is preferably further remote in an axial direction from the first planetary gear set than from the second planetary gear set. In particular by way of the connectability of the planet gear carrier to the gearbox housing, a particularly large gearbox spread, and a small structural space requirement of the multi-stage gearbox, can be realized.

In a preferred embodiment of the multi-stage gearbox, the first spur gear meshes with a fourth spur gear, and the fourth spur gear is connectable to the internal gear of the first planetary gear set. The fourth spur gear and the internal gear of the first planetary gear set are preferably arranged coaxially or concentrically with respect to one another. It is furthermore preferable for the fourth spur gear and the internal gear of the first planetary gear set to be formed integrally with one another. It is furthermore preferable for the fourth spur gear and the internal gear of the first planetary gear set to be understood to be a ring-shaped device/component with an external toothing (fourth spur gear) and an internal-gear toothing (internal gear of the first planetary gear set). In particular by way of a fourth spur gear connected to the internal gear of the first planetary gear set, a particularly compact construction of the multi-stage gearbox can be realized.

According to the invention, a direct coupling and an indirect coupling of one of the gearwheels, in particular of the first spur gear, to the gearbox housing are made possible. A direct or immediate coupling is to be understood in the context of the invention to mean that a shift device is arranged at one side on the gearwheel, in particular on the first spur gear, and at the other side on the gearbox housing, and that the gearwheel and the gearbox housing are contactable by the shift device for the purposes of transmitting torque. In the context of the invention, an indirect coupling of one of the gearwheels to the gearbox housing is to be understood to mean a kinematic coupling of these to one another. It is preferably the case that, for such indirect coupling, a spur gear which meshes with the gearwheel, in particular a spur gear arranged concentrically with respect to the epicyclic gearbox shaft, is connectable by way of a shift device to the gearbox housing. By way of rolling contact between the gearwheel and the spur gear that meshes therewith, the gearwheel, in particular the first spur gear, is connectable indirectly to the gearbox housing by way of the shift device.

In a preferred embodiment of the multi-stage gearbox, at least one of the second planet gears meshes with a sun pinion of the second planetary gear set, and the outer diameter of the second sun pinion is greater than the outer diameter of the first sun pinion. In particular by way of this diameter gradation of the first and second sun pinions, a particularly good gearbox spread can be realized. The multi-stage gearbox preferably has six connecting points for the selective connection of components of the multi-stage gearbox to one another by way of shift devices. The multi-stage gearbox accordingly has, in particular, six shift devices. Tests have shown that, with this layout, a large gearbox spread and a small structural space requirement can be realized.

In a preferred embodiment of the multi-stage gearbox, at least one of the second planet gears meshes with a sun pinion of the second planetary gear set, and the outer diameter of the second sun pinion is smaller than the outer diameter of the first sun pinion. The multi-stage gearbox preferably has seven connecting points for the selective connection of components of the multi-stage gearbox to one another by way of shift devices. The multi-stage gearbox accordingly has, in particular, seven shift devices. Tests have shown that, with this layout, a fine gradation of the gearbox spread and a small structural space requirement can be realized.

In a preferred embodiment, both planetary gear sets have only a single internal gear; it is preferable for the first planetary gear set to have an internal gear and furthermore preferable for the second planetary gear set, by way of which drive is output in the direction of the driveable wheel/tire unit (epicyclic gearbox shaft), to have no internal gear.

In a preferred embodiment, the multi-stage gearbox has six shift devices, wherein these are combined in each case in pairwise fashion in torque-transmitting devices, in such a way that, in a torque-transmitting device, only one of the two shift devices is activatable (power transmission made possible). In particular by way of the combination of shift devices to form a torque-transmitting device, a structural space saving can be realized. For the combination, use is preferably made of so-called 2-way sliding sleeves, which in one position activate the first shift device and in a second position activate the second shift device. It is furthermore preferable for the multi-stage gearbox to have seven shift devices. It is preferable for at least two, preferably four or particular preferably six shift devices to be combined in each case in pairwise fashion in torque-transmitting devices, such that in each case only one of the two shift devices is activatable.

Here, the outer diameter of the sun pinions relates in each case to the toothing region thereof designed for transmitting motion.

With a multi-stage gearbox according to the invention, it is possible for drivetrains which are of particularly compact construction, and which are efficient, for motor vehicles to be realized.

In the context of the invention, a drivetrain is to be understood to mean a device which at least one drive machine, preferably an internal combustion engine, preferably a reciprocating-piston engine, a multi-stage gearbox according to the invention, and at least one driveable wheel, preferably multiple driveable wheels, and also means for connecting the drive machine to the multi-stage gearbox and for connecting the multi-stage gearbox to the driveable wheel. Here, the multi-stage gearbox is preferably actuable in automated fashion or is preferably manually actuable. It is preferably the case in a drivetrain of this type that the spur-gear shaft is couplable to at least one drive machine. It is preferable for the epicyclic gearbox shaft to be designed as a drive-output shaft of the multi-stage gearbox device, by way of which the drive power can be output in the direction of the at least one driveable wheel. Here, in the context of the invention, a wheel is to be understood to mean a wheel-tire unit of a motor vehicle.

Other objects, advantages and novel features of the present invention will become apparent from the following detailed description of one or more preferred embodiments when considered in conjunction with the accompanying drawings.

DETAILED DESCRIPTION OF THE DRAWINGS

Figures 1, 2:
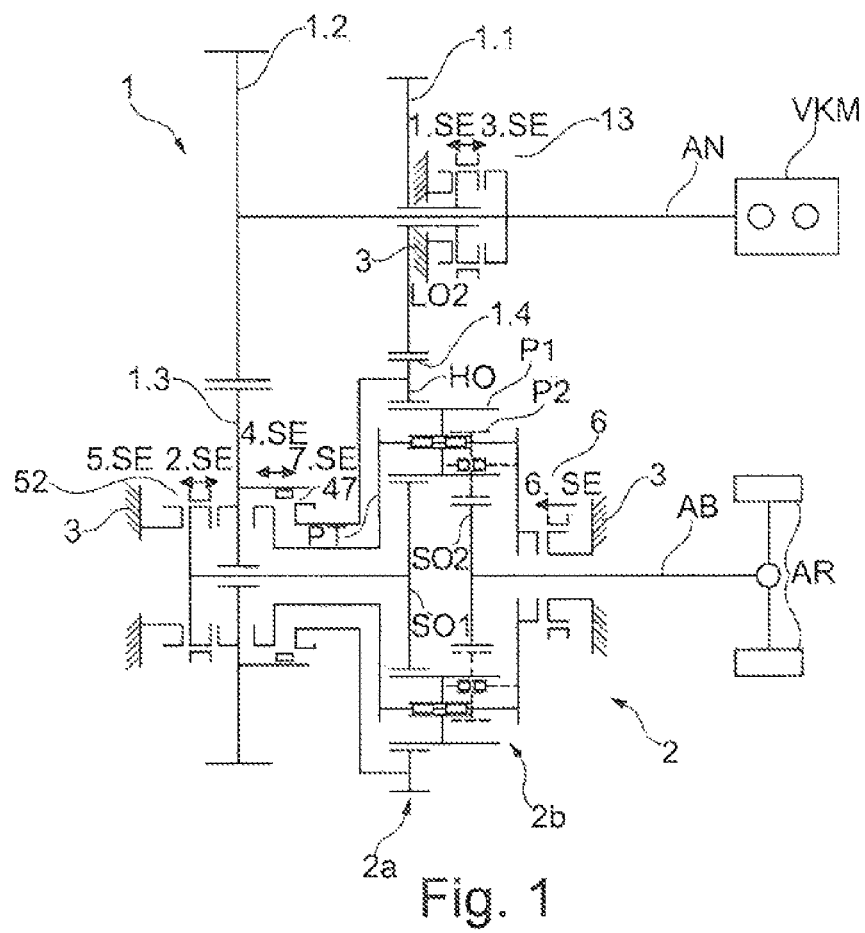
FIG. 1 is a schematic diagram of a longitudinal section through a combined seven-gearspeed multi-stage gearbox according to an embodiment of the invention.
FIG. 2 is a shift diagram for a combined seven-gearspeed multi-stage gearbox of this type.

FIG. 1 illustrates a longitudinal section through a multi-stage gearbox. The multi-stage gearbox has a first sub-gearbox 1, which is in the form of a spur-gear gearbox, and a second sub-gearbox 2, which is in the form of an epicyclic gearbox device with two planetary gear sets (2a, 2b). The supply of power (rotational speed, torque) into the multi-stage gearbox is realized via the spur-gear shaft AN, and drive is output via the epicyclic gearbox shaft AB. The first sub-gearbox 1 has a first spur gear 1.1 and a second spur gear 1.2.

The drive power (rotational speed, torque) is supplied to the multi-stage gearbox, and thus to the drivetrain, by way of the internal combustion engine VKM. By way of the multi-stage gearbox, the transmission ratio between the shafts AN/AB can be adapted, and the drive power can be output via the epicyclic gearbox shaft AB to the driveable wheels AR.

The first spur gear 1.1 is selectively connectable in torque-conducting fashion to the spur-gear shaft AN by way of a torque-transmitting device 13 in which shift devices 1.SE and 3.SE are structurally combined. The first shift device 1.SE is designed to connect the first spur gear 1.1 to the gearbox housing 3.

The shift device 3.SE is designed to connect the spur gear 1.1 to the sun pinion shaft AN. The spur gear 1.1 meshes with a fourth spur gear 1.4, and said fourth spur gear 1.4 is arranged coaxially with respect to the epicyclic gearbox shaft AB. The second spur gear 1.2 meshes with a third spur gear 1.3, and said third spur gear 1.3 is also arranged coaxially with respect to the epicyclic gearbox shaft AB. The third spur gear 1.3 has a torque-transmitting device 52, in which the shift devices 5.SE and 2.SE are structurally combined, and a further torque-transmitting device 47, in which the shift devices 4.SE and 7.SE are structurally combined.

By way of the shift device 2.SE, the third spur gear 1.3 is connectable to the sun pinion shaft SO1 of the first planetary gear set 2a. By way of the shift device 5.SE, said sun pinion shaft SO1 is connectable to the gearbox housing 3. Here, the torque-transmitting device 52 is designed such that in each case only the shift device 2.SE or the shift device 5.SE is activatable. Here, the activation is to be understood to mean that a torque can be transmitted by the shift device.

By way of the shift device 7.SE, the third spur gear 1.3 is connectable to the internal gear HO of the first planetary gear set 2a. The internal gear HO is arranged concentrically with respect to, and formed integrally with, the fourth spur gear 1.4. By way of the shift device 4.SE, the third spur gear 1.3 is connectable to the planet gear carrier PT of the epicyclic gearbox.

Here, the torque-transmitting device 47 is designed such that either the shift device 4.SE or the shift device 7.SE is activatable.

The first planet gears P1 and the second planet gears P2 are rotatably mounted on the planet gear carrier PT. The planet gears P1 and P2 are mounted on the planet gear carrier PT such that said planet gears mesh with one another. The first planet gears P1 furthermore mesh with the internal gear HO. The second planet gears P2 mesh with the sun pinion SO2 of the second planetary gear set 2b. The sun pinion SO2 of the second planetary gear set 2b has a smaller outer diameter than the sun pinion SO1 of the first planetary gear set 2a.

The planet gear carrier PT has a torque-transmitting device 6, and the torque-transmitting device 6 has a shift device 6.SE, by way of which the planet gear carrier PT is connectable to the gearbox housing 3. If one of the gearbox elements is connected to the gearbox housing 3, specifically the sun pinion shaft SO1 by way of the shift device 5.SE, the planet gear carrier PT by way of the shift device 6.SE or the first spur gear 1.1 by way of the shift device 1.SE, said gearbox element is immobilized and has a rotational speed of zero. Through the selective coupling of said gearbox elements to the gearbox housing 3, on the one hand, and the selective coupling of gearbox elements to one another by way of the shift devices 2.SE, 4.SE and 3.SE, it is possible by way of said multi-stage gearbox to realize one reverse gearspeed and seven forward gearspeeds. Here, the torque-transmitting devices (6, 13, 47, 52) are designed such that in each case only two shift devices (1.SE to 7.SE) are activated for one gearspeed stage (reverse gearspeed and first to seventh gearspeed).

FIG. 2 shows a shift diagram for a multi-stage gearbox according to the invention. In the table shown in FIG. 2, the greyed regions indicate that a shift device (1.SE to 7.SE) is activated. It can be seen from the shift diagram that in each case only two shift devices are activated for a respective gearspeed.

Figures 3, 4:
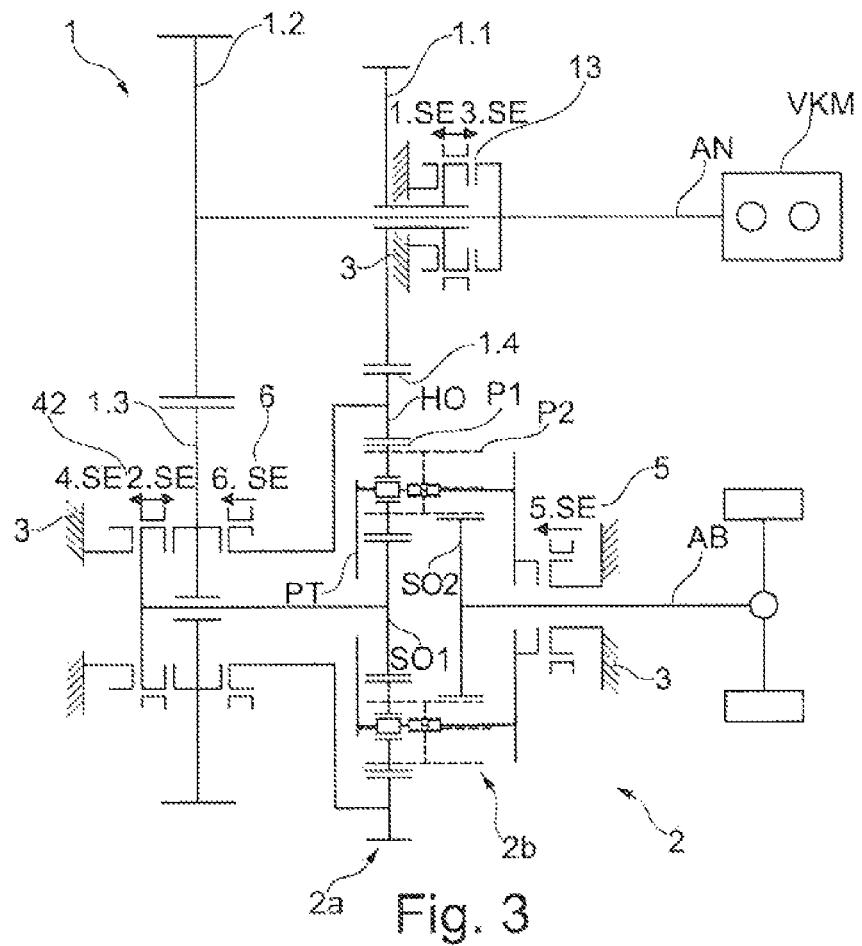
FIG. 3 is a schematic diagram of a longitudinal section through a combined multi-stage gearbox according to an embodiment of the invention with six forward gearspeeds.
FIG. 4 is a shift diagram for a combined six-gearspeed multi-stage gearbox of this type.

FIG. 3 illustrates a longitudinal section through a multi-stage gearbox according to the invention with six shift stages. The multi-stage gearbox has a first sub-gearbox 1, which is in the form of a spur-gear gearbox, and a second sub-gearbox 2, which is in the form of an epicyclic gearbox device with two planetary gear sets (2a, 2b). The supply of power (rotational speed, torque) into the multi-stage gearbox is realized via the spur-gear shaft AN, and drive is output via the epicyclic gearbox shaft AB. The first sub-gearbox has a first spur gear 1.1 and a second spur gear 1.2.

The drive power (rotational speed, torque) is supplied to the multi-stage gearbox, and thus to the drivetrain, by way of the internal combustion engine VKM. By way of the multi-stage gearbox, the transmission ratio between the shafts AN/AB can be adapted, and the drive power can be output via the epicyclic gearbox shaft AB to the driveable wheels AR.

The first spur gear 1.1 is selectively connectable in torque-conducting fashion to the spur-gear shaft AN by way of a torque-transmitting device 13 in which shift devices 1.SE and 3.SE are structurally combined. The first shift device 1.SE is designed to connect the first spur gear 1.1 to the gearbox housing 3.

The shift device 3.SE is designed to connect the spur gear 1.1 to the sun pinion shaft AN. The spur gear 1.1 meshes with a fourth spur gear 1.4, and said fourth spur gear 1.4 is arranged coaxially with respect to the epicyclic gearbox shaft AB. The second spur gear 1.2 meshes with a third spur gear 1.3, and said third spur gear 1.3 is also arranged coaxially with respect to the epicyclic gearbox shaft AB. The third spur gear 1.3 has a torque-transmitting device 42, in which the shift devices 4.SE and 2.SE are structurally combined, and a further torque-transmitting device 6, in which the shift device 6.SE is accommodated.

By way of the shift device 2.SE, the third spur gear 1.3 is connectable to the sun pinion shaft SO1 of the first planetary gear set 2a. By way of the shift device 4.SE, said sun pinion shaft SO1 is connectable to the gearbox housing 3. Here, the torque-transmitting device 42 is designed such that in each case only the shift device 2.SE or the shift device 4.SE is activatable.

By way of the shift device 6.SE, the third spur gear 1.3 is connectable to the internal gear HO of the first planetary gear set 2a. The internal gear HO is arranged concentrically with respect to, and formed integrally with, the fourth spur gear 1.4.

The first planet gears P1 and the second planet gears P2 are rotatably mounted on the planet gear carrier PT. The planet gears P1 and P2 are mounted on the planet gear carrier PT so as to mesh with one another. The first planet gears P1 furthermore mesh with the internal gear HO. The second planet gears P2 mesh with the sun pinion SO2 of the second planetary gear set 2b. The sun pinion SO2 of the second planetary gear set 2b has a larger outer diameter than the sun pinion SO1 of the first planetary gear set 2a.

The planet gear carrier PT has a torque-transmitting device 5, and the torque-transmitting device 5 has a shift device 5.SE, by way of which the planet gear carrier PT is connectable to the gearbox housing 3. If one of the gearbox elements is connected to the gearbox housing 3, specifically the sun pinion shaft SO1 by way of the shift device 4.SE, the planet gear carrier PT by way of the shift device 5.SE or the first spur gear 1.1 by way of the shift device 1.SE, said gearbox element is immobilized and has a rotational speed of zero. Through the selective coupling of said gearbox elements to the gearbox housing 3, on the one hand, and the selective coupling of gearbox elements to one another by way of the shift devices 2.SE, 3.SE and 6.SE, it is possible by way of said multi-stage gearbox to realize one reverse gearspeed and six forward gearspeeds. Here, the torque-transmitting devices (5, 6, 13, 42) are designed such that in each case only two shift devices (1.SE to 6.SE) are activated for one gearspeed stage (reverse gearspeed and first to sixth gearspeed).

FIG. 4 shows a shift diagram for a six-gearspeed multi-stage gearbox according to the invention. In the table shown in FIG. 4, the greyed regions indicate that a shift device (1.SE to 6.SE) is activated. It can be seen from the shift diagram that in each case only two shift devices are activated for a respective gearspeed.

Figures 5, 6:
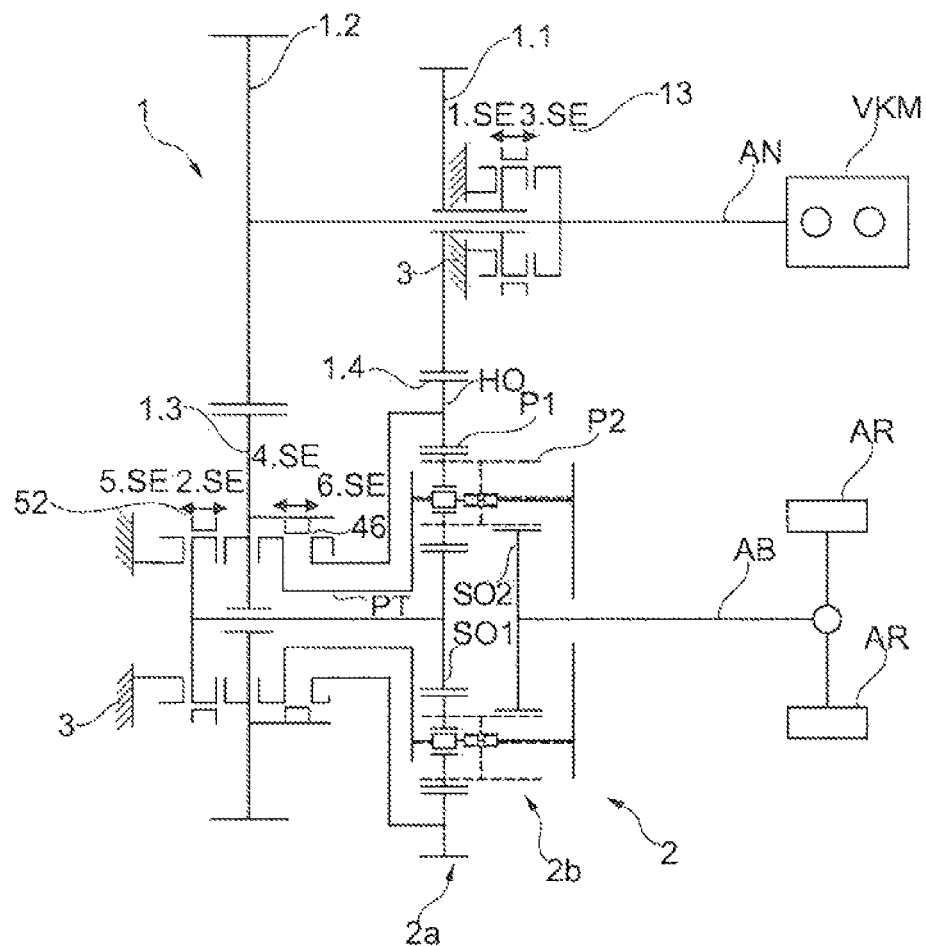
FIG. 5 is a schematic diagram of a longitudinal section through a combined multi-stage gearbox according to an embodiment of the invention with six forward gearspeeds.
FIG. 6 is a shift diagram for a combined six-gearspeed multi-stage gearbox of this type.

FIG. 5 illustrates a longitudinal section through a multi-stage gearbox according to the invention with six shift stages. The multi-stage gearbox has a first sub-gearbox 1, which is in the form of a spur-gear gearbox, and a second sub-gearbox 2, which is in the form of an epicyclic gearbox device with two planetary gear sets (2a, 2b). The supply of power (rotational speed, torque) into the multi-stage gearbox is realized via the spur-gear shaft AN, and drive is output via the epicyclic gearbox shaft AB. The first sub-gearbox has a first spur gear 1.1 and a second spur gear 1.2.

The drive power (rotational speed, torque) is supplied to the multi-stage gearbox, and thus to the drivetrain, by way of the internal combustion engine VKM. By way of the multi-stage gearbox, the transmission ratio between the shafts AN/AB can be adapted, and the drive power can be output via the epicyclic gearbox shaft AB to the driveable wheels AR.

The first spur gear 1.1 is selectively connectable in torque-conducting fashion to the spur-gear shaft AN by way of a torque-transmitting device 13 in which shift devices 1.SE and 3.SE are structurally combined. The first shift device 1.SE is designed to connect the first spur gear 1.1 to the gearbox housing 3.

The shift device 3.SE is designed to connect the spur gear 1.1 to the sun pinion shaft AN. The spur gear 1.1 meshes with a fourth spur gear 1.4, and said fourth spur gear 1.4 is arranged coaxially with respect to the epicyclic gearbox shaft AB. The second spur gear 1.2 meshes with a third spur gear 1.3, and said third spur gear 1.3 is also arranged coaxially with respect to the epicyclic gearbox shaft AB. The third spur gear 1.3 has a torque-transmitting device 52, in which the shift devices 5.SE and 2.SE are structurally combined, and a further torque-transmitting device 46, in which the shift devices 6.SE and 4.SE are structurally combined.

By way of the shift device 2.SE, the third spur gear 1.3 is connectable to the sun pinion shaft SO1 of the first planetary gear set 2a. By way of the shift device 5.SE, said sun pinion shaft SO1 is connectable to the gearbox housing 3. Here, the torque-transmitting device 52 is designed such that in each case only the shift device 2.SE or the shift device 5.SE is activatable.

By way of the shift device 6.SE, the third spur gear 1.3 is connectable to the internal gear HO of the first planetary gear set 2a. The internal gear HO is arranged concentrically with respect to, and formed integrally with, the fourth spur gear 1.4. By way of the shift device 4.SE, the third spur gear is selectively connectable in torque-conducting fashion to the planet gear carrier PT of the first and second planetary gear sets 2b.

The first planet gears P1 and the second planet gears P2 are rotatably mounted on the planet gear carrier PT. The planet gears P1 and P2 are mounted on the planet gear carrier PT so as to mesh with one another. Furthermore, the first planet gears P1 mesh with the internal gear HO. The second planet gears P2 mesh with the sun pinion SO2 of the second planetary gear set 2b. The sun pinion SO2 of the second planetary gear set 2b has a larger outer diameter than the sun pinion SO1 of the first planetary gear set 2a.

In this embodiment, all shift devices 1.SE to 6.SE are structurally combined in each case in pairwise fashion in torque-transmitting devices 13, 46 and 52, and particularly simple actuation thereof is realized, and furthermore, a reduced structural space requirement can be achieved, because in each case only one (2-way) sliding sleeve is used for two shift devices.

If one of the gearbox elements is connected to the gearbox housing 3, specifically the sun pinion shaft SO1 by way of the shift device 5.SE or the first spur gear 1.1 by way of the shift device 1.SE, said gearbox element is immobilized and has a rotational speed of zero. Through the selective coupling of said gearbox elements to the gearbox housing 3, on the one hand, and the selective coupling of gearbox elements to one another by way of the shift devices 2.SE, 3.SE, 4.SE and 6.SE, it is possible by way of said multi-stage gearbox to realize one reverse gearspeed and six forward gearspeeds. Here, the torque-transmitting devices (13, 46, 52) are designed such that in each case only two shift devices (1.SE to 6.SE) are activated for one gearspeed stage (reverse gearspeed and first to sixth gearspeed).

FIG. 6 shows a shift diagram for a six-gearspeed multi-stage gearbox according to the invention. In the table shown in FIG. 6, the greyed regions indicate that a shift device (1.SE to 6.SE) is activated. It can be seen from the shift diagram that in each case only two shift devices are activated for a respective gearspeed.

Figure 7:
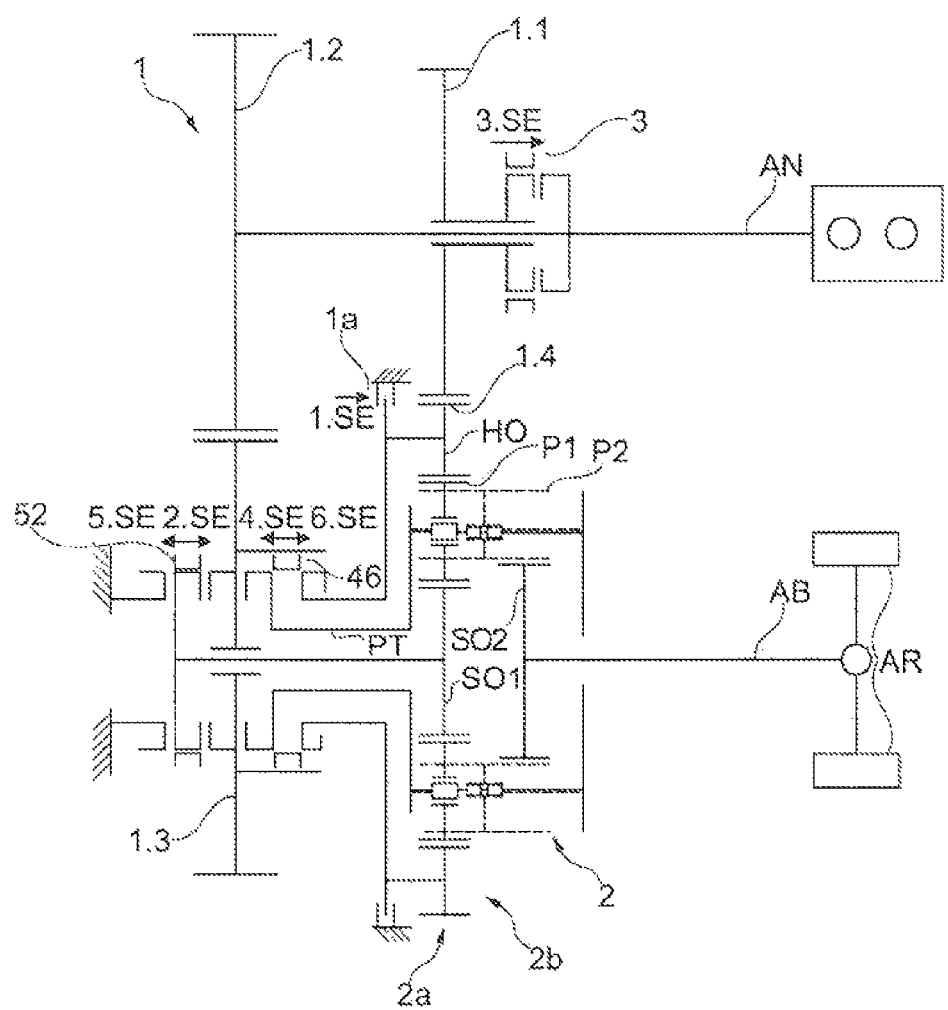
FIG. 7 is a schematic diagram of a longitudinal section through a multi-stage gearbox according to an embodiment of the invention with seven forward gearspeeds and indirect coupling of the first spur gear to the gearbox housing.

FIG. 7 substantially illustrates the multi-stage gearbox known from FIG. 5, such that the differences between said gearboxes will be discussed below. The first spur gear 1.1 is firstly selectively connectable in torque-conducting fashion by way of the torque-transmitting device 3 and the shift device 3.SE to the spur-gear shaft AN. Furthermore, indirect coupling of the first spur gear 1.1 is made possible by way of the torque-transmitting device 1a and the shift element 1.SE.

For a multi-stage gearbox as illustrated in FIG. 7, the shift diagram known from FIG. 6 can be used for the control thereof.

Figures 8, 9:
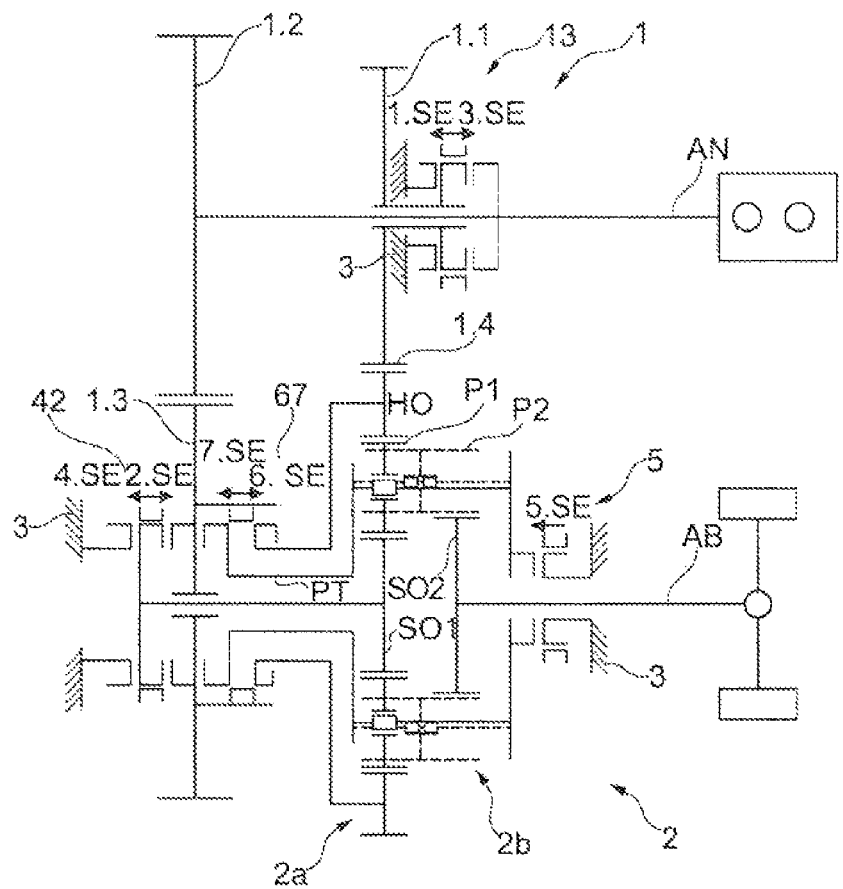
FIG. 8 is a schematic diagram of a longitudinal section through a combined multi-stage gearbox according to an embodiment of the invention with seven forward gearspeeds.
FIG. 9 is a shift diagram for a combined six-gearspeed multi-stage gearbox of this type.

FIG. 8 illustrates a longitudinal section through a multi-stage gearbox according to the invention. The multi-stage gearbox has a first sub-gearbox 1, which is in the form of a spur-gear gearbox, and a second sub-gearbox 2, which is in the form of an epicyclic gearbox device with two planetary gear sets (2a, 2b). The supply of power (rotational speed, torque) into the multi-stage gearbox is realized via the spur-gear shaft AN, and drive is output via the epicyclic gearbox shaft AB; here, the epicyclic gearbox shaft is concentric with respect to the axis of rotation of the third and fourth spur gears (1.3, 1.4). The first sub-gearbox has a first spur gear 1.1 and a second spur gear 1.2.

The drive power (rotational speed, torque) is supplied to the multi-stage gearbox, and thus to the drivetrain, by way of the internal combustion engine VKM. By way of the multi-stage gearbox, the transmission ratio between the shafts AN/AB can be adapted, and the drive power can be output via the epicyclic gearbox shaft AB to the driveable wheels AR.

The first spur gear 1.1 is selectively connectable in torque-conducting fashion to the spur-gear shaft AN by way of a torque-transmitting device 13 in which shift devices 1.SE and 3.SE are structurally combined. The first shift device 1.SE is designed to connect the first spur gear 1.1 to the gearbox housing 3.

The shift device 3.SE is designed to connect the spur gear 1.1 to the sun pinion shaft AN. The spur gear 1.1 meshes with a fourth spur gear 1.4, and said fourth spur gear 1.4 is arranged coaxially with respect to the epicyclic gearbox shaft AB. The second spur gear 1.2 meshes with a third spur gear 1.3, and said third spur gear 1.3 is also arranged coaxially with respect to the epicyclic gearbox shaft AB. The third spur gear 1.3 has a torque-transmitting device 42, in which the shift devices 4.SE and 2.SE are structurally combined, and a further torque-transmitting device 67, in which the shift devices 6.SE and 7.SE are structurally combined.

By way of the shift device 2.SE, the third spur gear 1.3 is connectable to the sun pinion shaft SO1 of the first planetary gear set 2a. By way of the shift device 4.SE, said sun pinion shaft SO1 is connectable to the gearbox housing 3. Here, the torque-transmitting device 42 is designed such that in each case only the shift device 2.SE or the shift device 4.SE is activatable. Here, the activation is to be understood to mean that a torque can be transmitted by the shift device.

By way of the shift device 7.SE, the third gearwheel 1.3 is connectable to the internal gear HO1 of the first planetary gear set 2a. The internal gear HO is arranged concentrically with respect to, and formed integrally with, the fourth spur gear 1.4, ring-shaped gearwheel with an external toothing (1.4) and an internal toothing (HO). By way of the shift device 6.SE, the third spur gear 1.3 is connectable to the planet gear carrier PT of the epicyclic gearbox (common planet gear carrier).

Here, the torque-transmitting device 67 is designed such that either the shift device 6.SE or the shift device 7.SE is activatable.

The first planet gears P1 and the second planet gears P2 are rotatably mounted on the planet gear carrier PT. The planet gears P1 and P2 are mounted on the planet gear carrier PT so as to mesh with one another. Furthermore, the first planet gears P1 mesh with the internal gear HO and the sun pinion shaft SO1. The second planet gears P2 mesh with the sun pinion SO2 of the second planetary gear set 2b, and the second planetary gear set 2b furthermore does not have a dedicated internal gear (reduced planetary gear set). The sun pinion SO2 of the second planetary gear set 2b has a larger outer diameter than the sun pinion SO1 of the first planetary gear set 2a.

The planet gear carrier PT has a torque-transmitting device 5, and the torque-transmitting device 5 has a shift device 5.SE by way of which the planet gear carrier PT is connectable to the gearbox housing 3. If one of the gearbox elements is connected to the gearbox housing 3, specifically the sun pinion shaft SO1 by way of the shift device 4.SE, the planet gear carrier PT by way of the shift device 5.SE or the first spur gear 1.1 by way of the shift device 1.SE, said gearbox element is immobilized and has a rotational speed of zero. Through the selective coupling of said gearbox elements to the gearbox housing 3, on the one hand, and the selective coupling of gearbox elements to one another by way of the shift devices 2.SE, 3.SE, 6.SE and 7.SE, it is possible by way of said multi-stage gearbox to realize one reverse gearspeed and seven forward gearspeeds. Here, the torque-transmitting devices (5, 13, 42, 67) are designed such that in each case only two shift devices (1.SE to 7.SE) are activated for one gearspeed stage (reverse gearspeed and first to seventh gearspeed).

FIG. 9 shows a shift diagram for a multi-stage gearbox according to the invention. In the table shown in FIG. 9, the greyed regions indicate that a shift device (1.SE to 7.SE) is activated. It can be seen from the shift diagram that in each case only two shift devices are activated for a respective gearspeed.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A combined multi-stage gearbox, comprising:
a spur-gear gearbox with at least one first and one second spur gear arranged on a spur-gear shaft;
an epicyclic gearbox with at least one first and one second reduced, planetary gear set and with an epicyclic gearbox shaft, wherein at least one of the planetary gear sets is arranged concentrically with respect to the epicyclic gearbox shaft;
a gearbox housing, wherein the spur-gear shaft and the epicyclic gearbox shaft are mounted so as to be rotatable relative to the gearbox housing; and
a multiplicity of shift devices, wherein
the first spur gear is selectively connectable in torque-conducting fashion to the spur-gear shaft,
the first spur gear is selectively connectable in torque-conducting fashion to the gearbox housing, and
only two shift devices are activated for at least one gearspeed stage.

2. The multi-stage gearbox according to claim 1, wherein the spur-gear shaft and the epicyclic gearbox shaft are, for power transmission from and to the multi-stage gearbox, designed such that the two gearbox shafts are arranged incongruently with respect to one another so as to be radially spaced apart from one another.

3. The multi-stage gearbox according to claim 1, wherein the second spur gear meshes with a third spur gear, and the third spur gear is selectively connectable in torque-conducting fashion to a sun gear of the first planetary gear set.

4. The multi-stage gearbox according to claim 3, wherein the third spur gear is selectively connectable in torque-conducting fashion to an internal gear of the first planetary gear set.

5. The multi-stage gearbox according to claim 4, wherein the first spur gear meshes with a fourth spur gear, and the fourth spur gear is connectable to the internal gear of the first planetary gear set.

6. The multi-stage gearbox according to claim 3, wherein the third spur gear is selectively connectable in torque-conducting fashion to the gearbox housing.

7. The multi-stage gearbox according to claim 3, wherein the third spur gear is selectively connectable in torque-conducting fashion to a planet gear carrier, at least of the first or of both planetary gear sets.

8. The multi-stage gearbox according to claim 1, wherein the first planetary gear set has at least one first planet gear, the second planetary gear set has at least one second planet gear,
the first planet gear meshes with the second planet gear, and
the first and the second planet gear are rotatably mounted on the planet gear carrier.

9. The multi-stage gearbox according to claim 8, wherein the planet gear carrier is selectively connectable in torque-conducting fashion to the gearbox housing.

10. The multi-stage gearbox according to claim 8, wherein
at least one of the second planet gears meshes with a second sun pinion of the second planetary gear set, and
an outer diameter of the second sun pinion of the second planetary gear set is greater than the outer diameter of a first sun pinion of the first planetary gear set, and
the multi-stage gearbox has at least six shift devices.

11. The multi-stage gearbox according to claim 8, wherein
at least one of the second planet gears meshes with a second sun pinion of the second planetary gear set, and
an outer diameter of the second sun pinion (SO2) is smaller than an outer diameter of a first sun pinion of the first planetary gear set, and
the multi-stage gearbox has at least six shift devices.

12. A drivetrain for a motor vehicle, comprising:
a multi-stage gearbox according to claim 1, wherein
the spur-gear shaft is couplable to a drive machine,
the epicyclic gearbox shaft is couplable to a drive-output shaft, and
by way of the drive-output shaft, drive power which is transmittable from the drive machine to the multi-stage gearbox is transmittable in a direction of at least one driveable wheel.

13. The multi-stage gearbox according to claim 1, wherein
only two shift devices are activated for each gearspeed stage.

* * * * *